United States Patent [19]

Sawatzky et al.

[11] Patent Number: 5,584,920
[45] Date of Patent: Dec. 17, 1996

[54] SULPHONATED HYDROCRACKING RESIDUES AS CONCRETE ADMIXTURES

[75] Inventors: Henry Sawatzky, Ottawa; Noel P. Mailvaganam, Orleans; Ian F. Clelland, Renfrew; Jean Houde, Jr., Gatineau; Brian A. Farnand, Nepean, all of Canada

[73] Assignee: Natural Resources Canada, Ottawa, Canada

[21] Appl. No.: 426,111

[22] Filed: Apr. 20, 1995

[51] Int. Cl.$^6$ .......................... C09D 1/08; C09D 195/00; C08L 95/00
[52] U.S. Cl. .......................... 106/274; 106/275; 106/668; 106/725; 252/353
[58] Field of Search .......................... 106/275, 274, 106/668, 725; 252/353

[56] References Cited

U.S. PATENT DOCUMENTS

| | | | |
|---|---|---|---|
| 1,826,166 | 10/1931 | Cory . | |
| 3,089,842 | 5/1963 | Stratton | 208/44 |
| 3,970,690 | 7/1976 | Suzuki et al. | 260/505 |
| 4,290,973 | 9/1981 | Aude et al. | 260/505 |
| 4,541,965 | 9/1985 | Thomson et al. | 260/505 |
| 5,221,344 | 6/1993 | Prevedello et al. | 106/807 |
| 5,236,500 | 8/1993 | Schneider et al. | 106/640 |
| 5,322,556 | 6/1994 | Prevedello et al. | 106/275 |

Primary Examiner—David Brunsman

[57] ABSTRACT

A process is described for preparing a water-soluble sulphonated dispersant from a petroleum hydrocracking residue comprising: contacting a petroleum hydrocracking residue boiling above 524° C. with concentrated sulphuric acid, oleum or sulphur trioxide to form a sulphonated mixture containing water soluble and water insoluble products, and separating the water soluble sulphonated product from the mixture. The mixture of water soluble and water insoluble sulphonated products is neutralized with alkali and evaporated to dryness, after which the dried mixture is extracted with alcohol to leave a water soluble product. The product can be used as a water reducer or superplasticizer in concrete.

13 Claims, 2 Drawing Sheets

SULPHONATED HYDROCRACKING RESIDUES AS CONCRETE ADMIXTURES

BACKGROUND OF THE INVENTION

This invention relates to admixtures or additives for concrete and mortar obtained by sulphonation of petroleum processing residues. It relates particularly to low foaming admixtures capable of functioning as, among other things, either water reducers or superplasticizers in concrete.

Water reducers either reduce the water requirement for a cement, mortar, or concrete mix without reducing the required initial workability, thus increasing the compressive strength, or increase the workability of a cement, mortar or concrete mix without increasing the water requirement. The superplasticizers also reduce water requirements, but permit much higher levels than is possible with normal water reducers, since they possess low surfactant properties which permits them to be added at much higher dosages without adverse effects due to air entrainment. Superplasticizers also typically have very high liquefying or plasticizing action, providing much higher workabilities. They are, however, much more expensive than normal water reducers. The normal water reducers are typically low cost lignosulphonatebased materials while superplasticizer formulations are based on more sophisticated manufacturing processes incorporating sulphonated melamine or naphthalene and formaldehyde.

U.S. Pat. No. 3,277,162 describes a dispersant obtained from the products of condensing formaldehyde with naphthalene sulphonic acid. U.S. Pat. No. 3,970,690 describes dispersants obtained from the products of sulphonation of the residues of from thermal cracking of petroleum oil. In U.K. Patent 2,159,536 a sulphonated dispersant is obtained from the products of sulphonation of tars. A dispersant obtained by the sulphonation of a petroleum asphalt fraction is described in U.S. Pat. No. 5,322,556.

It is an object of the present invention to produce relatively inexpensive admixtures for concrete, from the sulphonation of hydrocracked petroleum residues, which will exhibit strong deflocculation characteristics without significantly lowering the surface tension of water. This combination would allow the admixture of this invention to perform as both a water reducer and a superplasticizer, resulting in not only a lower priced superplasticizer, but further economy due to the elimination of storage and dispensing equipment for a separate water reducer, and would provide better quality control due to the wider range of water reduction available, and a decrease in the number of concrete ingredients.

SUMMARY OF THE INVENTION

According to the present invention, a water soluble, sulphonated dispersant is prepared from a petroleum hydrocracking residue by contacting a hydrocracking residue boiling above 524° C. with sulphuric acid, oleum or sulphur trioxide to form a sulphonated mixture containing water soluble and water insoluble products. The water soluble sulphonated product is separated from the mixture as the admixture or additive of the invention.

The separation of the water soluble sulphonated product from the mixture is preferably carried out by neutralizing the mixture with alkali, then evaporating the mixture to dryness and finally extracting the dried mixture with alcohol to leave the water soluble product. Although a variety of alcohols such as methanol, ethanol, propanol, etc. may be used, methanol is particularly preferred.

It is particularly advantageous according to the present invention if the sulphonated admixtures are obtained by the sulphonation of hydrocracked residues obtained by hydrocracking of heavy residues, such as heavy vacuum bottoms and heavy oils or bitumens from Western Canada. The hydrocracked residues may come, from either a thermal hydrocracking process or catalytic cracking processes. A typical thermal hydrocracking process is one carried out in the presence of iron sulphate, such as that described in Belinko et al U.S. Pat. No. 4,963,247, incorporated herein by reference. Typical catalysts for catalytic hydrocracking may include such products as cobalt or nickel molybdate. For the purposes of the present invention, the products are typically hydrocracked at pressures in the range of 500–3,000 psi and temperatures in the range of 325° to 500° C.

It is also preferable that the sulphonated products of the present invention are derived from residues obtained from high conversion hydrocracking processes. In the thermal hydrocracking of heavy oils and bitumens, high levels of conversion are achieved to maximize the amounts of material distilling to 524° C. as the remaining residue has little potential for further upgrading. In technologies that utilize conventional hydrocracking catalysts, the levels of conversion are not generally as high and further conversion can be achieved by coking.

The high conversion petroleum refining processes in current use tend to concentrate sulphur from a large amount of oil into a much smaller amount of petroleum residue. This residue, because of its high sulphur concentration, is environmentally most unattractive as a fuel and is, therefore, of little or no commercial value. As a consequence, the sulphonated products of this invention can be produced at very low cost.

The hydrocracking residues utilized in the present invention are preferably of a relatively high molecular weight, e.g. having an average molecular weight of about 400 to 5000. They typically have a carbon content of about 80 to 85% by weight.

The sulphonated product of this invention has the important advantages of not only being inexpensive to produce, but also having strong deflocculating characteristics without lowering the surface tension of water thus adding various properties to concrete, including increased flow and workability at either low or high levels of additions, which facilitates either small or large reductions in the amount of mix water required. As a result, it can be used both as a traditional water reducer and as a superplasticizer. Since only one admixture or additive is needed for both of the above purposes, this represents a further saving in storage and dispensing equipment. Moreover, it provides better quality control in ready-mixed concrete operations since the number of concrete ingredients is reduced.

Another important advantage of the sulphonated product of this invention is that it can be used at very high dosages in concrete mixtures to very significantly retard hydration. This characteristic can be used to advantage particularly when pouring concrete in hot weather where current superplasticizers are prone to rapid loss of the initially attained high workability.

DESCRIPTION OF THE PREFERRED EMBODIMENTS

For testing the effectiveness of the present invention, two basic hydrocracking residues were utilized, one being a thermal cracking residue and the other being a catalytic cracking residue. The thermal hydrocracking residue, referred to hereinafter as CANMET residue, is a commercial residue obtained from the thermal hydrocracking of vacuum tower bottoms from Canadian Interprovincial Pipeline crude oil. The HRI residue is a commercial residue obtained from a Husky Oil catalytic cracking process. The properties of the two residues are shown in Table 1 below:

TABLE 1

Properties of Residues

|  | CANMET/IPPL | HRI |
| --- | --- | --- |
| Average Molecular Weight | 915 | 759 |
| Elemental analysis |  |  |
| C (wt %) | 81.1 | 84.9 |
| H (wt %) | 8.05 | 9.32 |
| N (wt %) | 0.83 | 0.80 |
| S (wt %) | 4.21 | 3.18 |

BRIEF DESCRIPTION OF THE DRAWINGS

Certain preferred embodiments of this invention are illustrated by the following examples in which reference is made to drawings in which.

EXAMPLE 1

Figure 1:
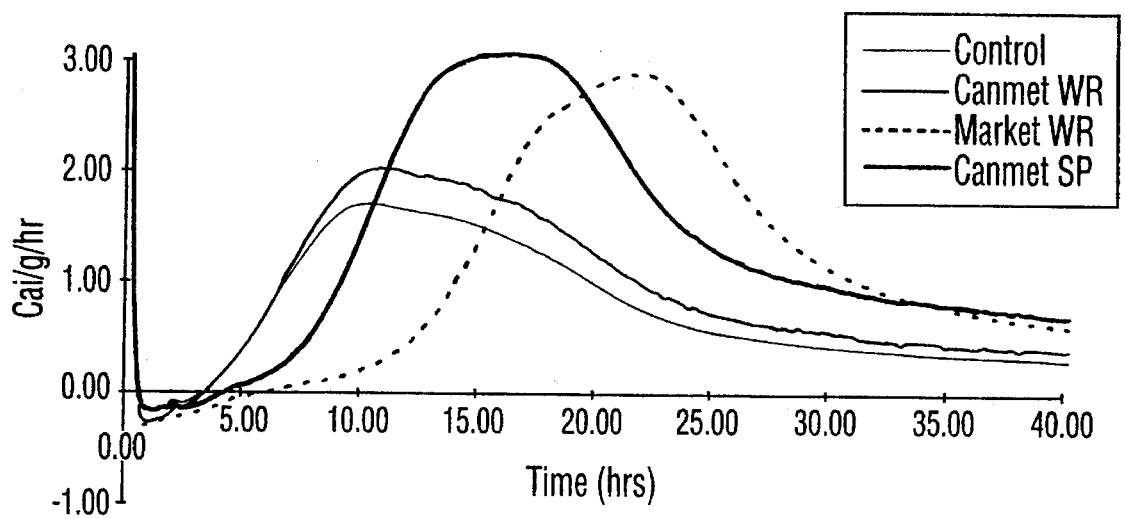
FIG. 1 is comparative conduction calorimetry curves for the product of the invention and a known product.

(a) 250 g of the CANMET hydrocracking residue was dissolved in 500 ml of methylene chloride. This solution was slowly added to a stirred mixture of 1000 ml of concentrated sulphuric acid and 500 ml of 15% fuming sulphuric acid at 0° C. The mixture was stirred overnight, allowing it to rise to ambient temperature. Then 2000 ml of water was added very slowly with cooling to keep the temperature below 10° C. The mixture was then neutralized with sodium carbonate and evaporated to dryness. The remaining solid was extracted with methanol and 280 g of solid extract was obtained as the admixture of the invention. Of this, 216.5 g (77.5%) was water soluble (CANMET #1).

(b) The above procedure was repeated using only 500 ml of the 15% fuming sulphuric acid rather than the above mixture and almost identical results were obtained.

EXAMPLE 2

25 g of Husky Oil Hydrocracking Residue (HRI) was treated with 100 ml of 15% fuming sulphuric acid under conditions similar to those of Example 1. In this case 19.4 g of water soluble and 14.7 g of water insoluble products were produced.

EXAMPLE 3

40 g of sulphur trioxide was distilled into 600 ml of symmetrical-tetrachloroethane in a 1 litre flask. The mixture was then heated to 55° C. and then while being stirred, 20 g of the CANMET hydrocracking residue dissolved in a mixture of 30 ml methylene chloride and 60 ml of the tetrachloroethane was added to the sulphur trioxide solution over a period of 50 minutes.

After further stirring at 55° C. for another 75 minutes, the reaction mixture was allowed to cool. Then the supernatant liquid was decanted from the reaction flask leaving the solids in the flask. To the solids in the reaction flask was added 200 ml of methylene chloride (to avoid overheating) and with stirring 200 ml of water. The aqueous mixture was then neutralized with 41.69 g of sodium carbonate then dried. From the dried solid mixture, 25.53 g of product "A" was obtained by extraction with methanol. The remaining solid was treated with 650 ml of water yielding 3.60 g of insoluble product "B" and 46.25 g of soluble product "C" was also obtained.

Product "A" contained 22.90 g of water soluble material and product "C" contained about 45% of sodium carbonate. Product "C" was used in the concrete tests. (CANMET #2)

EXAMPLE 4

The water soluble sulphonated hydrocracking residue obtained in Example 1, henceforth to be referred to as CANMET 1, and the analogous residue obtained in Example 3, henceforth to be referred to as CANMET #2, were used as admixtures to produce in separate mortar mixes for testing. These were prepared by mixing dry Portland cement, the sulphonated admixtures of the invention, water and sand. In these tests, the sulphonated admixtures of the invention were added in lower dosages to the mix water, to function as water reducing agents, and in higher dosages to the whole mix after an initial 3 minutes of mixing, to function as superplasticizers. Trial batches were made using CANMET #1 to determine dosage requirements prior to the making of the larger test batches, and the determined dosage was used for both admixtures of the invention. For comparison purposes, control samples were made for both sets of admixtures tested Conduction calorimetry tests were also performed on both admixtures, in order to observe the cement heat of hydration curves for mixes incorporating varying dosages of the admixture of the invention, and to compare the degree of retardation of mixes using the admixture of the invention to that of comparable admixtures. For these tests, four different mortar mixtures were used as follows:

(a) a control with no admixture;

(b) a mixture containing either a commercial water reducer or a superplasticizer;

(c) a mixture containing a water reducing amount of the admixture of this invention (CANMET WR);

(d) a mixture containing a superplasticizing amount of the admixture of this invention (CANMET SP).

CANMET #1 Results

The trial batch results can be found in Table 2. The mix design for the CANMET #1 test samples can be found in Table 3. The 28 day compressive strength results, as well as flow results, for CANMET #1 can be found in Table 4

TABLE 2

Trial Batches for Canmet #1

|  | Control | Canmet WR | Canmet SP |
| --- | --- | --- | --- |
| Cement (g) | 285 | 285 | 285 |
| Sand (g) | 715 | 715 | 715 |
| Canmet #1ª (g) | 0 | 0.77 | 11.43 |
| Water (g) | 142.86 | 134.4 | 121.5 |
| Admixture (%) | 0.00 | 0.05 | 0.80 |

TABLE 2-continued

Trial Batches for Canmet #1

|  | Control | Canmet WR | Canmet SP |
| --- | --- | --- | --- |
| Wet Density (g/cc) | 2.25 | 2.28 | 2.27 |
| W/C Ratio | 0.50 | 0.47 | 0.43 |
| Water Reduction (%) | 0 | 6 | 15 |
| Flow (10 drops) | 96.5 | 93 | 93 |

[a]20% solids

TABLE 3

Mix Design for Canmet #1 Test Samples

|  | Control | Canmet WR | Canmet SP |
| --- | --- | --- | --- |
| Cement (g) | 857 | 857 | 857 |
| Sand (g) | 2143 | 2143 | 2143 |
| Canmet #1[a] (g) | 0.00 | 2.45 | 35.00 |
| Water (g) | 429 | 403 | 365 |
| Admixture (%)[b] | 0 | 0.06 | 0.82 |

[a]20% solids
[b]Solids, by weight of cement

TABLE 4

Canmet #1 Test Results

|  | Control | Canmet WR | Canmet SP |
| --- | --- | --- | --- |
| W/C Ratio | 0.50 | 0.47 | 0.43 |
| Water Reduction (%) |  | 6 | 15 |
| Flow (10 drops) | 101.5 | 94 | 124 |
| 28 Day Compressive Strength (psi) | | | |
| 1 | 7900 | 7875 | 8150 |
| 2 | 8050 | 8150 | 7950 |
| 3 | 8075 | 7975 | 9000 |
| 4 | 8125 | 8150 | 7625 |
| Mean | 8038 | 8038 | 8181 |
| Standard Deviation | 96.82 | 136.17 | 587.15 |
| 95% Confidence | 8134.32 | 8173.67 | 8768.40 |
| Mean Range | 7940.68 | 7901.33 | 7594.10 |
| Strength Increase (%) |  | 0 | 1.8 |

Both the trial batch results and the test results show that the addition of CANMET #b 1 permitted a reduction in the water cement ratio of the mixes, without adversely affecting flow. The degree of w/c reduction is dependent on the admixture dosage, thus reinforcing the ability of this admixture to serve as both a water reducer and a superplasticizer. The wet densities of the trial batches were unaffected by the use of this admixture, indicating that significant air entrainment did not occur. The 28 day compressive strength of the test samples corroborate those results. Therefore, the admixture appears to possess the ability to increase the flow and workability of mortar mixtures and, due to its low surfactant properties, can be used at the high dosages necessary to perform as a superplasticizer.

While the compressive strength results show no deleterious effects resulting from the use of CANMET #1, there is, however, only a minimal strength increase caused by the w/c reduction. This is likely a consequence of the low sand/cement ratio used, and more dramatic results would be obtained at higher sand cement ratios.

The results of the conduction calorimetry run for CANMET #1 are shown in FIG. 1, and indicate that the cement heat of hydration curve is not seriously affected by the use of the admixture as a water reducer. The result confirms that large delay of the hydration peak is not caused by the use of CANMET #1, as is possible from the use of the market water reducer. When used at a superplasticizer dosage, however, CANMET #1 is capable of retarding hydration by over five hours. This can be advantageous under hot weather conditions.

CANMET #2 Results

The mix design for the CANMET #2 test samples are shown in Table 5 below. It should be noted that the sand/cement ratio was increased to 4.0, as compared to the 2.5 sand/cement ratio used in the CANMET #1 testing, in order to accentuate the effect of the admixture on compressive strength. The 28 day compressive strength and wet property results can be found in Table 6.

TABLE 5

Mix Design for Canmet #2 Test Samples

|  | Control | Canmet WR | Canmet SP |
| --- | --- | --- | --- |
| Cement (g) | 600 | 600 | 600 |
| Sand (g) | 2400 | 2400 | 2400 |
| Canmet #2[a] | 0 | 1.8 | 18 |
| Water | 390 | 370.5 | 331.5 |
| % Admixture[b] | 0 | 0.06 | 0.60 |

[a]20% solids solution
[b]Solids, by weight of cement

TABLE 6

Canmet #2 Test Results

|  | Control | Canmet WR | Canmet SP |
| --- | --- | --- | --- |
| W/C Ratio | 0.65 | 0.62 | 0.58 |
| Water Reduction (%) | 0 | 5 | 15 |
| Flow (20 drops) | 102.5 | 86 | 70 |
| 28 Day Compressive Strength (psi) | | | |
| 1 | 3450 | 3700 | 3975 |
| 2 | 3500 | 3150 | 3625 |
| 3 | 3400 | 3325 | 3675 |
| 4 | 3575 | 3700 | 3900 |
| Mean | 3481 | 3469 | 3794 |
| Standard Deviation | 74.65 | 276.42 | 170.02 |
| 95% Confidence | 3555.90 | 3745.17 | 3963.77 |
| Mean Range | 3406.60 | 3192.33 | 3623.73 |
| Strength Increase (%) |  | −0.3 | 9.0 |

It can be seen that use of this admixture facilitates water reduction in the mix and that varying the admixture dosage does vary the degree of water reduction permissible. The benefit derived from reduction in w/c ratio is reflected in increased compressive strength of the superplasticized mix.

Figure 2:
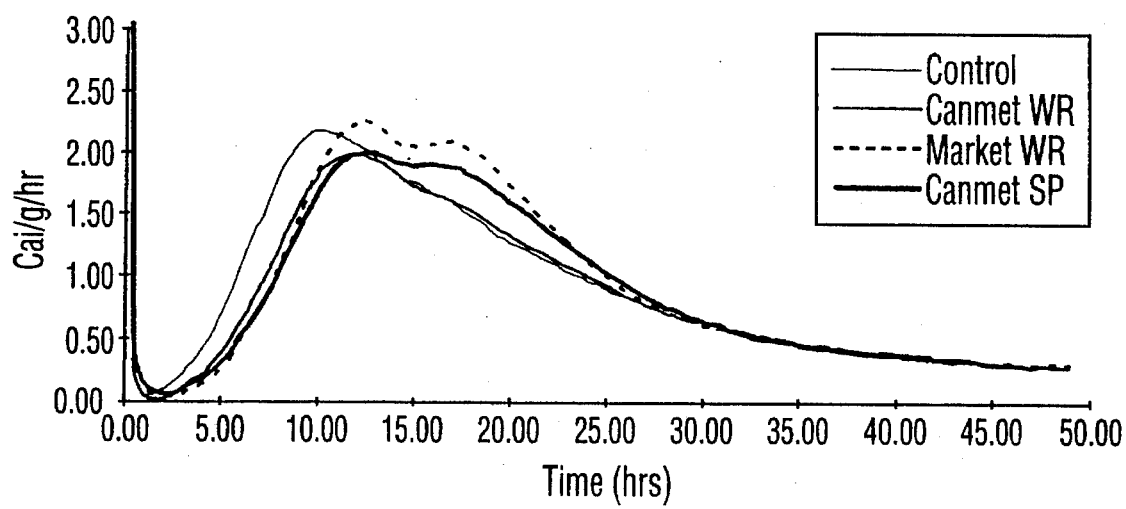
FIG. 2 is further comparative conduction calorimetry curves.

The conduction calorimetry results for CANMET #2, shown in FIG. 2, indicate a very similar cement hydration curve for both the market superplasticizer and the CANMET #2 SP. Although neither curve suggests the possibility for severe retardation, both do retard the hydration by about five hours.

EXAMPLE 5

The admixtures of the invention were incorporated into concrete mix designs, and their properties were tested against controls and presently marketed admixtures. A total of 8 concrete mix designs were formulated and tested for slump, air content, wet density, and 28 day compressive strength. The mixes were divided into two categories, water reduced and superplasticized, with a control mix made for each. All concrete mixes had a basic mix design of 1:2.1:2.9, cement:sand:stone, and a w/c ratio of 0.5 was used for the water reduced mixes, while this was dropped to 0.475 for the superplasticized mixes. Recommended admixture dosages were used for the market admixtures, while the required dosages for the admixtures of the invention were determined from the mortar testing results. The amount of mix water used was adjusted to account for water content of the admixtures.

A summary of the mix designs can be found in Table 7 and the concrete mix results are shown in Table 8.

TABLE 7

Mix Design for Concrete Test Samples

|  | Control WR | Canmet WR #1 | Canmet WR #2 | Market WR | Canmet SP #1 | Canmet SP #2 | Market SP | Control SP |
|---|---|---|---|---|---|---|---|---|
| Cement (g) | 4,167 | 4,167 | 4,167 | 4,167 | 4,167 | 4,167 | 4,167 | 4,167 |
| Sand (g) | 8,750 | 8,750 | 8,750 | 8,750 | 8,750 | 8,750 | 8,750 | 8,750 |
| Stone (g) | 12,083 | 12,083 | 12,083 | 12,083 | 12,083 | 12,083 | 12,083 | 12,083 |
| Canmet #1 (g)[a] |  | 12.50 |  |  | 125.00 |  |  |  |
| Canmet #2 (g)[a] |  |  | 12.50 |  |  | 125.00 |  |  |
| Market WR (g)[b] |  |  |  | 1.25 |  |  |  |  |
| Market SP (g)[b] |  |  |  |  |  |  | 12.50 |  |
| Water (g) | 2,083 | 2,073 | 2,073 | 2,083 | 1,879 | 1,879 | 1,979 | 1,979 |
| % Admixture[c] | 0.00% | 0.06% | 0.06% | 0.03% | 0.60% | 0.60% | 0.30% | 0.00% |

[a]20% solids solution
[b]Powder
[c]Solids, by weight of cement

TABLE 8

Concrete Test Results

|  | Control WR | Canmet WR #1 | Canmet WR #2 | Market WR | Canmet #SP #1 | Canmet SP #2 | Market SP | Control SP |
|---|---|---|---|---|---|---|---|---|
| W/C Ratio | 0.5 | 0.5 | 0.5 | 0.5 | 0.475 | 0.475 | 0.475 | 0.475 |
| Slump (inches) | 4.5 | 7.5 | 6.5 | 6 | 10 | 7 | 8 | 4 |
| Air Content (%) | 0.8 | 0.6 | 0.7 | 1.6 | 1.9 | 1.1 | 2.8 | 1.1 |
| Wet Density (g/cc) | 2.46 | 2.46 | 2.46 | 2.45 | 2.43 | 2.47 | 2.41 | 2.44 |
| 28 Day Compressive Strength (psi) | | | | | | | | |
| 1 | 6088 | 5511 | 6167 | 5929 | 5252 | 6207 | 5551 | 5511 |
| 2 | 5889 | 5511 | 5690 | 5491 | 5212 | 6247 | 5312 | 5929 |
| 3 | 5809 | 5670 | 6108 | 5272 | 5471 | 5869 | 5352 | 5929 |
| 4 | 5690 | 5332 | 5829 | 5491 | 5053 | 6287 | 5471 | 5968 |
| Mean | 5869 | 5506 | 5948 | 5546 | 5247 | 6152 | 5421 | 5834 |
| Standard Deviation | 167 | 138 | 227 | 275 | 172 | 192 | 110 | 216 |
| 95% Confidence | 6036 | 5644 | 6175 | 5821 | 5419 | 6344 | 5531 | 6050 |
| Mean Range | 5702 | 5368 | 5722 | 5270 | 5075 | 5961 | 5312 | 5618 |

The wet density, which is dependent on w/c ratio and air content, was relatively consistent, ranging from a low of 2.41 for the market superplasticizer mix, to a high of 2.47 for the CANMET #2 superplasticizer mix. The air content was generally lower for the water reduced samples, but, notably, was lower for the admixtures of the invention than for the corresponding market products. Therefore, the surfactant properties of the admixtures of the invention are significantly lower than that of the admixtures presently being marketed.

Figure 3:
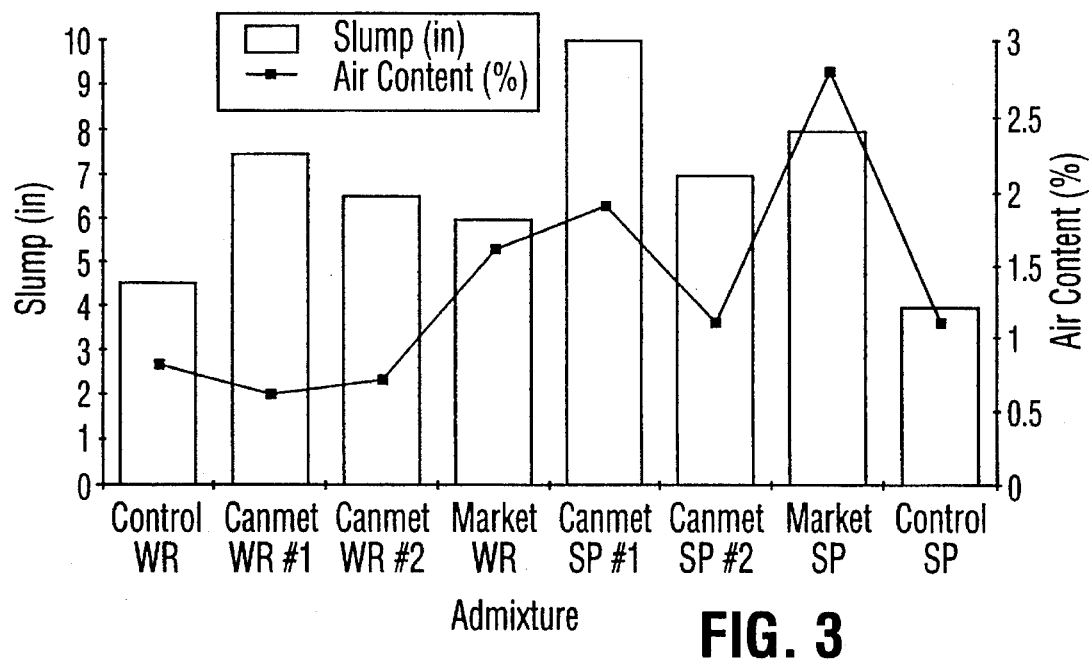
FIG. 3 is a plot of slump and air content for various concrete mixes.

Even though slump is influenced by air content, the slumps of the mixes using the admixtures of the invention were high as compared to market products with higher air contents. FIG. 3 graphically illustrates this fact, as it plots both air content and slump for the eight samples. CANMET #1 was the most effective admixture at both applications, water reducing and superplasticizing, the latter increasing the slump by 250%. Therefore, it appears that the admixtures of this invention have the capability of outperforming the presently available admixtures, in terms of producing favourable wet properties in concrete mixes.

Figure 4:
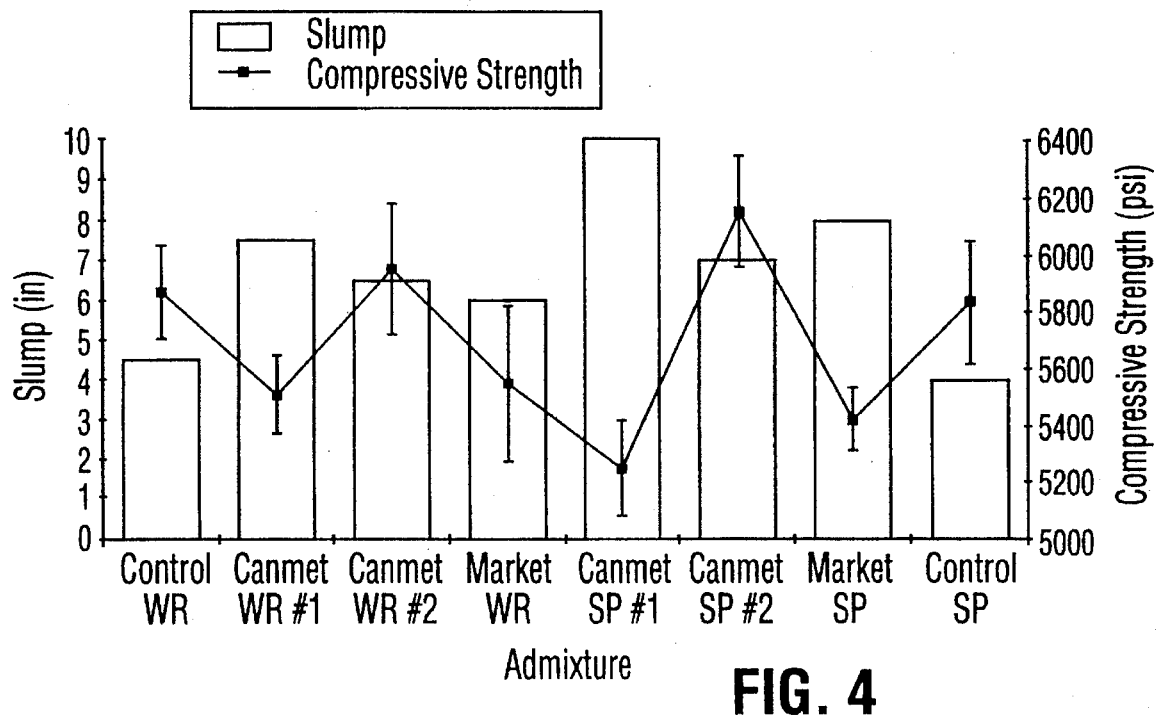
FIG. 4 is a plot of slump and compressive strength for various concrete mixes.

The compressive strength of concrete, which ordinarily is largely dependent on w/c ratio, can be adversely affected by slumps in excess of 7 inches, due to the effects of segregation on the mix. This is evident in the 28 day strengths of the CANMET #1 mixes (both WR and SP), and the market superplasticizer mix, and is indicated in FIG. 4, which plots slump and 28 day compressive strength for each of the mixes. Otherwise, the strengths are roughly similar to the respective controls, suggesting the absence of any unfavourable effects on strength, moreover, CANMET #2 mixes, both water reducing and superplasticizing, exhibit increased slump and compressive strength as compared to the control.

We claim:

1. A process for preparing a water-soluble sulphonated dispersant from a petroleum hydrocracking residue comprising:

contacting a petroleum hydrocracking residue boiling above 524° C. with concentrated sulphuric acid, oleum or sulphur trioxide to form a sulphonated mixture containing water soluble and water insoluble products, and separating the water soluble sulphonated product from the mixture.

2. A process according to claim 1 wherein the mixture of water soluble and water insoluble sulphonated products is neutralized with alkali and evaporated to dryness, after which the dried mixture is extracted with alcohol to leave a water soluble product.

3. A process according to claim 2 wherein the alcohol is methanol.

4. A process according to claim 1 wherein the hydrocracking residue is obtained from the hydrocracking of bitumen or heavy oil.

5. A process according to claim 4 wherein the hydrocracking is a high conversion hydrocracking process.

6. A process according to claim 5 wherein the hydrocracking is a thermal hydrocracking process with a conversion of about 85%.

7. A process according to claim 5 wherein the hydrocracking is a catalytic hydrocracking process with a conversion of at least 80%.

8. A process according to claim 5 wherein the hydrocracking is carried out at a temperature in the range of 325–500° C.

9. A process according to claim 1 wherein the hydrocracking residue has an average molecular weight in the range of 400 to 5000.

10. A process according to claim 1 wherein the hydrocracking residue is dissolved in an inert solvent prior to sulphonation.

11. A method of fluidifying and stabilizing an aqueous dispersion of solids comprising adding to the aqueous dispersion of solids an amount of the sulphonated dispersant produced by the process as defined in claim 1.

12. A method as claimed in claim 11, wherein the dispersant is added in high concentration sufficient to act as a superfluidizing additive.

13. A method as claimed in claim 11 wherein said aqueous dispersions are aqueous dispersions of cement.

* * * * *